US011880762B2

United States Patent
Negishi et al.

(10) Patent No.: US 11,880,762 B2
(45) Date of Patent: Jan. 23, 2024

(54) CHOOSING EXECUTION MODE OF A NEURAL NETWORK BASED ON TOTAL MEMORY USAGE

(71) Applicant: INTERNATIONAL BUSINESS MACHINES CORPORATION, Armonk, NY (US)

(72) Inventors: Yasushi Negishi, Tokyo (JP); Haruki Imai, Kanagawa (JP); Taro Sekiyama, Chiba (JP); Tung D. Le, Chiba (JP); Kiyokuni Kawachiya, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1197 days.

(21) Appl. No.: 16/018,680

(22) Filed: Jun. 26, 2018

(65) Prior Publication Data

US 2019/0392306 A1 Dec. 26, 2019

(51) Int. Cl.
*G06N 3/08* (2023.01)
*G06N 3/063* (2023.01)
*G06F 9/50* (2006.01)

(52) U.S. Cl.
CPC ............. *G06N 3/08* (2013.01); *G06F 9/5016* (2013.01); *G06N 3/063* (2013.01)

(58) Field of Classification Search
CPC . G06N 3/08; G06N 3/063; G06N 3/04; G06F 9/5016
See application file for complete search history.

(56) References Cited

U.S. PATENT DOCUMENTS

| 8,259,119 B1* | 9/2012 | Diard .................... G06F 1/3293 345/503 |
| 2015/0379426 A1 | 12/2015 | Steele et al. |
| 2016/0342888 A1 | 11/2016 | Yang et al. |
| 2018/0253261 A1* | 9/2018 | Kripalani ................ G06F 3/067 |
| 2019/0220316 A1* | 7/2019 | Zhao ...................... G06N 3/084 |

(Continued)

FOREIGN PATENT DOCUMENTS

CN 107844376 A * 3/2018

OTHER PUBLICATIONS

Ito et al. ooc cuDNN: Accommodating Convolutional Neural Networks over GPU Memory Capacity, Dec. 11-14, 2017, IEEE, 2017 IEEE International Conference on Big Data (Big Data), pp. 1-10 (Year: 2017).*

(Continued)

*Primary Examiner* — Meng Ai T An
*Assistant Examiner* — Hsing Chun Lin
(74) *Attorney, Agent, or Firm* — Tutunjian & Bitetto, P.C.; Robert Richard Aragona (57) ABSTRACT

A computer-implemented method, a computer program product, and a computer processing system are provided for selecting from among multiple Graphics Processing Unit (GPU) execution modes for a Neural Network (NN) having a size greater than a threshold size. The multiple GPU execution modes include a normal memory mode, an Out-of-Core (OoC) execution mode, and a Unified Memory (UM) mode. The method includes starting an execution on the NN with the UM mode and measuring the memory usage for each of layers of the NN. The method further includes selecting an execution mode based on the memory usage of all of the layers.

8 Claims, 6 Drawing Sheets

(56) References Cited

U.S. PATENT DOCUMENTS

| | | | |
|---|---|---|---|
| 2019/0324901 A1* | 10/2019 | Cui | G06F 12/0646 |
| 2019/0370071 A1* | 12/2019 | Matveev | G06F 12/0875 |
| 2021/0182077 A1* | 6/2021 | Chen | G06K 9/00268 |

OTHER PUBLICATIONS

Mishra et al. Benchmarking and Evaluating Unified Memory for OpenMP GPU Offloading, Nov. 12-17, 2017, ACM, pp. 1-10 (Year: 2017).*

Song et al. CN 107844376 A Description Translation, Mar. 27, 2018, [database online], [retrieved on Sep. 24, 2021] Retrieved from Espacenet using Internet <URL:https://worldwide.espacenet.com/publicationDetails/description?CC=CN&NR=107844376A&KC=A&FT=D&ND=3&date=20180327&DB=&locale=en_EP>, pp. 1-21 (Year: 2018).*

Wang et al. SuperNeurons: Dynamic GPU Memory Management for Training Deep Neural Networks, Feb. 10, 2018, ACM SIGPLAN Notices vol. 53 Issue 1, pp. 1-13 (Year: 2018).*

Rhu et al. vDNN: Virtualized Deep Neural Networks for Scalable, Memory-Efficient Neural Network Design, Jul. 28, 2016, [retrieved on Apr. 1, 2022] Retrieved from <URL:https:/arxiv.org/pdf/1602.08124.pdf>, pp. 1-13 (Year: 2016).*

Cui et al. GeePS: Scalable deep learning on distributed GPUs with a GPU-specialized parameter server, Apr. 18-21, 2016, [retrieved on Apr. 1, 2022] Retrieved from <URL:https://www.pdl.cmu.edu/PDL-FTP/CloudComputing/GeePS-cui-eurosys16.pdf>, pp. 1-16 (Year: 2016).*

Sekiyama et al. Profile-guided memory optimization for deep neural networks, Apr. 26, 2018, [retrieved on Jan. 27, 2023], Retrieved from <URL:https://www.semanticscholar.org/reader/d782ded174fc33a0801c1d83393f5870fc70cf54>, pp. 1-7 (Year: 2018).*

Lane et al. DeepX: A Software Accelerator for Low-Power Deep Learning Inference on Mobile Devices, Apr. 11-14, 2016, [retrieved on Jan. 27, 2023], Retrieved from <URL:https://ieeexplore.ieee.org/stamp/stamp.jsp?tp=&arnumber=7460664>, pp. 1-12 (Year: 2016).*

Rizvi, Optimized Deep Neural Networks for Real-Time Object Classification on Embedded GPUs, Aug. 11, 2017, <URL:https://www.mdpi.com/2076-3417/7/8/826>, pp. 1-19 (Year: 2017).*

Li, Lu, "Programming Abstractions and Optimization Techniques for GPU-based Heterogeneous Systems", Linkoping Studies in Science and Technology Dissertations. No. 1903, Department of Computer and Information Science, Feb. 2018, 195 pages.

Meng et al., "Training Deeper Models by GPU Memory Optimization on TensorFlow", 31st Conference on Neural Information Processing Systems (NIPS 2017), Dec. 2017, pp. 1-8.

Rhu et al., "vDNN: Virtualized Deep Neural Networks for Scalable, Memory-Efficient Neural Network Design", arXiv:1602.08124v3 [cs.DC] Jul. 28, 2016, 13 pages.

* cited by examiner

CHOOSING EXECUTION MODE OF A NEURAL NETWORK BASED ON TOTAL MEMORY USAGE

BACKGROUND

Technical Field

The present invention generally relates to machine learning, and more particularly to a mechanism for choosing execution mode for a large neural network.

Description of the Related Art

Deep Neural Networks (DNNs) are becoming increasingly popular, and the corresponding DNN models are becoming increasing larger. Accordingly, a DNN model will likely not fit into the memory of a single Graphics Processing Unit (GPU) in the future.

There are several execution modes to support larger NN models than an actual physical GPU memory. The several execution modes include a normal memory mode (hereinafter "normal mode", a.k.a. "simple GPU mode"), an Out-Of-Core (OoC) mode, a Unified Memory (UM) mode, and a combination mode of two or more of the preceding modes.

In normal mode, GPU memory is used in a simple manner. Normal mode runs the fastest (of the modes), and requires no modification of network model definitions.

In OoC mode, data is explicitly transferred between the GPU and CPU. OoC mode runs faster than UM mode, can support larger models than Memory Reduction (e.g., gradient-checkpointing that saves GPU memory by discording memory that can be recomputed again by other data), but less models than UM mode.

In UM mode, CUDA's Unified Memory is used to support large models. UM mode runs slower, but supports larger models than OoC mode. Such larger model support is important especially for POWER processor differentiation because it utilizes GPU-CPU NVLink® of Power.

In a combination mode involving two or more of the preceding modes, the UM mode can be used for a specific layer, as an example.

However, it is difficult to identify the network definition before the first execution. Hence, there is a need for a mechanism to choose an execution mode for a large neural network, in order to achieve an optimal execution.

SUMMARY

According to an aspect of the present invention, a computer-implemented method is provided for selecting from among multiple Graphics Processing Unit (GPU) execution modes for a Neural Network (NN) having a size greater than a threshold size. The multiple GPU execution modes include a normal memory mode, an Out-of-Core (OoC) execution mode, and a Unified Memory (UM) mode. The method includes starting an execution on the NN with the UM mode and measuring the memory usage for each of layers of the NN. The method further includes selecting an execution mode based on the memory usage of all of the layers.

According to another aspect of the present invention, a computer program product is provided for selecting from among multiple Graphics Processing Unit (GPU) execution modes for a Neural Network (NN) having a size greater than a threshold size. The multiple GPU execution modes include a normal memory mode, an Out-of-Core (OoC) execution mode, and a Unified Memory (UM) mode. The computer program product includes a non-transitory computer readable storage medium having program instructions embodied therewith. The program instructions are executable by a computer to cause the computer to perform a method. The method includes starting an execution on the NN with the UM mode and measuring the memory usage for each of layers of the NN. The method further includes selecting an execution mode based on the memory usage of all of the layers.

According to yet another aspect of the present invention, a computer processing system is provided for selecting from among multiple Graphics Processing Unit (GPU) execution modes for a Neural Network (NN) having a size greater than a threshold size. The multiple GPU execution modes include a normal memory mode, an Out-of-Core (OoC) execution mode, and a Unified Memory (UM) mode. The system includes at least one GPU. The system further includes a memory for storing program code. The system also includes a processing element for running the program code to start an execution on the NN with the UM mode and measuring the memory usage for each of layers of the NN. The processing element further runs the program code to select an execution mode based on the memory usage of all of the layers.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a mechanism for choosing execution mode for a large Neural Network (NN). In an embodiment, the mechanism is used to ensure that any executing NN will actually fit into the physical memory of an individual Graphics Processing Unit (GPU). In an embodiment, the present invention is able to dynamically switch execution modes on-the-fly on a layer-by-layer basis or phase (forward, backward) basis, thus ensuring flexibility in executing a neural network on a GPU. In an embodiment, the present invention includes an execution part that runs with an initially chosen mode and determines whether a memory shortage occurs. In an embodiment, the present invention includes a decision part that makes an execution mode decision for subsequent iterations in order to optimize memory use and avoid out of memory conditions during execution of the NN.

In an embodiment, the present invention can be used to select the optimal execution mode for a large NN from among a set of multiple available execution modes, thus improving the performance of the computer in processing and deploying the NN.

As the size of GPU memories is constantly changing (i.e., increasing), quantification of what is considered a large neural network is transitory. However, as a current example, a large neural network can be considered to be one that uses is 20 GB or 40 GB, which cannot be fit into memory of typical GPUs, such as 16 GB or 32 GB. Accordingly, various embodiments herein can use a threshold as a measure of whether a NN is considered large for the purposes of the present invention, where the threshold can relate to various actual physical GPU memory sizes.

In an embodiment, execution commences with a selection of Unified Memory mode, and the memory usage of each layer of an NN is measured. Accordingly, the appropriate execution mode is selected according to the memory usage of all of the layers of the NN. The memory usage can be readily determined. For example, NVIDIA® provides NVIDIA's system management interface (NVIDIA_smi) as a tool to determine memory usage. Of course, other tools and techniques can also be used to measure memory usage, while maintaining the spirit of the present invention.

In an embodiment, when a memory shortage occurs during the execution, the execution mode is changed to Unified Memory (UM) mode by copying data on normal (i.e., non-unified) memory to Unified Memory.

In an embodiment, different execution modes can be selected for each layer. In an embodiment, different execution modes can be selected for forward and backward phases. Other variations are readily determined by one of ordinary skill in the art, given the teachings of the present invention provided herein, while maintaining the spirit of the present invention.

Figure 1:
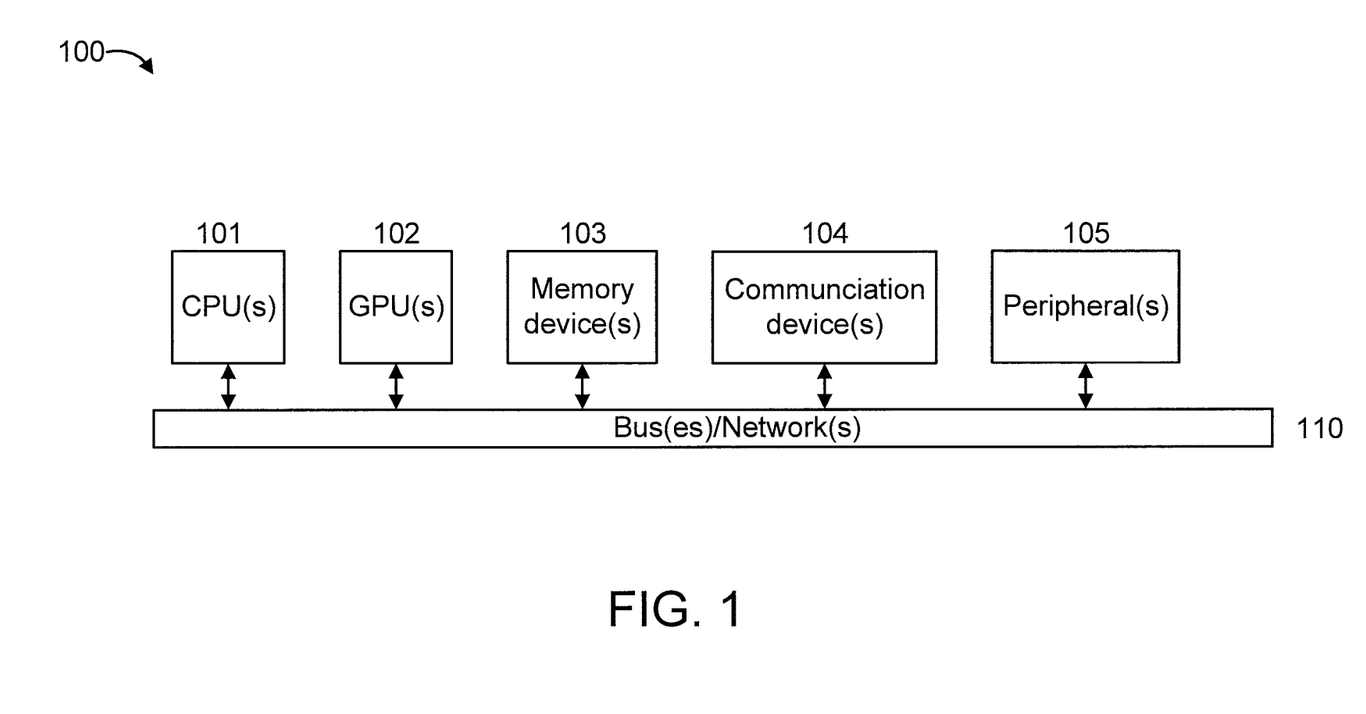
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 5-6). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
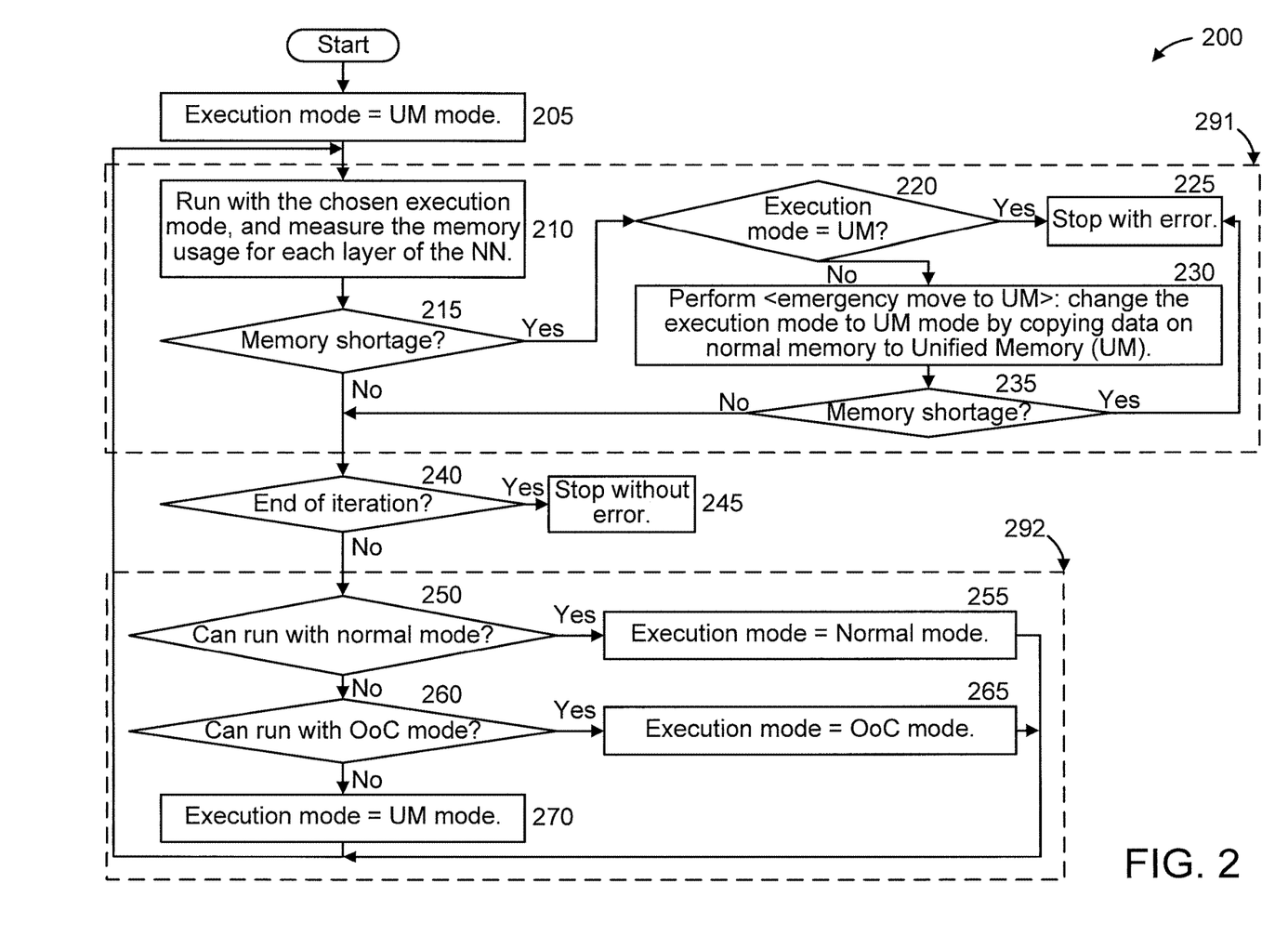
FIG. 2 is a flow diagram showing an exemplary method for selecting an execution mode from a set of multiple execution modes for a large neural network, in accordance with an embodiment of the present invention.

FIG. 2 is a flow diagram showing an exemplary method 200 for selecting an execution mode from a set of multiple execution modes for a large neural network, in accordance with an embodiment of the present invention. In an embodiment, method 200 can be considered to include an execution part 291 and a decision part 292. The execution part 291 includes blocks 210 through 235. The decision part 292 includes blocks 250-270. The execution part 291 runs with the chosen mode. In an embodiment, the execution part 291 may change to UM mode if a memory shortage occurs during the execution. The decision part 292 decides the execution mode for the next iteration. In an embodiment, the method 200 can be performed as a cloud service and/or using cloud technology (see, e.g., FIGS. 5-6). In an embodiment, the method 200 can be performed by CPU 101.

At block 205, commence with a selection of UM mode. UM mode is the safest mode to run, and it runs as fast as normal mode, if the corresponding NN memory fits in the physical GPU's memory.

At block 210, run with the chosen execution mode, and measure the memory usage for each layer of the NN.

At block 215, determine whether or not a memory shortage occurs with the execution. If so, then proceed to block 220. Otherwise, proceed to block 240.

At block 220, determine whether or not the (selected) execution mode is UM mode. If so, then proceed to block 225. Otherwise, proceed to block 230.

At block 225, stop the method 200 with error.

At block 230, perform <emergency move to UM>: change the execution mode to UM mode by copying data on normal memory to Unified Memory (UM).

At block 235, determine whether or not a memory shortage occurs with the execution. If so, then proceed to block 225. Otherwise, proceed to block 240.

At block 240, determine whether or not the end of the iteration has been reached. If so, then proceed to block 245. Otherwise, proceed to block 250.

At block 245, stop the memory 200 without error.

At block 250, determine whether or not the NN can be run with normal mode. If so, then proceed to block 255. Otherwise, proceed to block 260. It is to be appreciated that block 250 may use one or both of RULE 1 and RULE 2 described below with respect to FIG. 4.

At block 255, set the execution mode=normal mode.

At block 260, determine whether or not the NN can run with OoC mode. If so, the proceed to block 265. Otherwise, proceed to block 270. It is to be appreciated that block 260 may use one or both of RULE 1 and RULE 2 described below with respect to FIG. 4.

At block 265, set the execution mode=OoC mode.

At block 270, set the execution mode=UM mode.

It is to be appreciated that once an execution mode is set for processing the NN, the NN is then processed using the selected execution mode.

Figure 3:
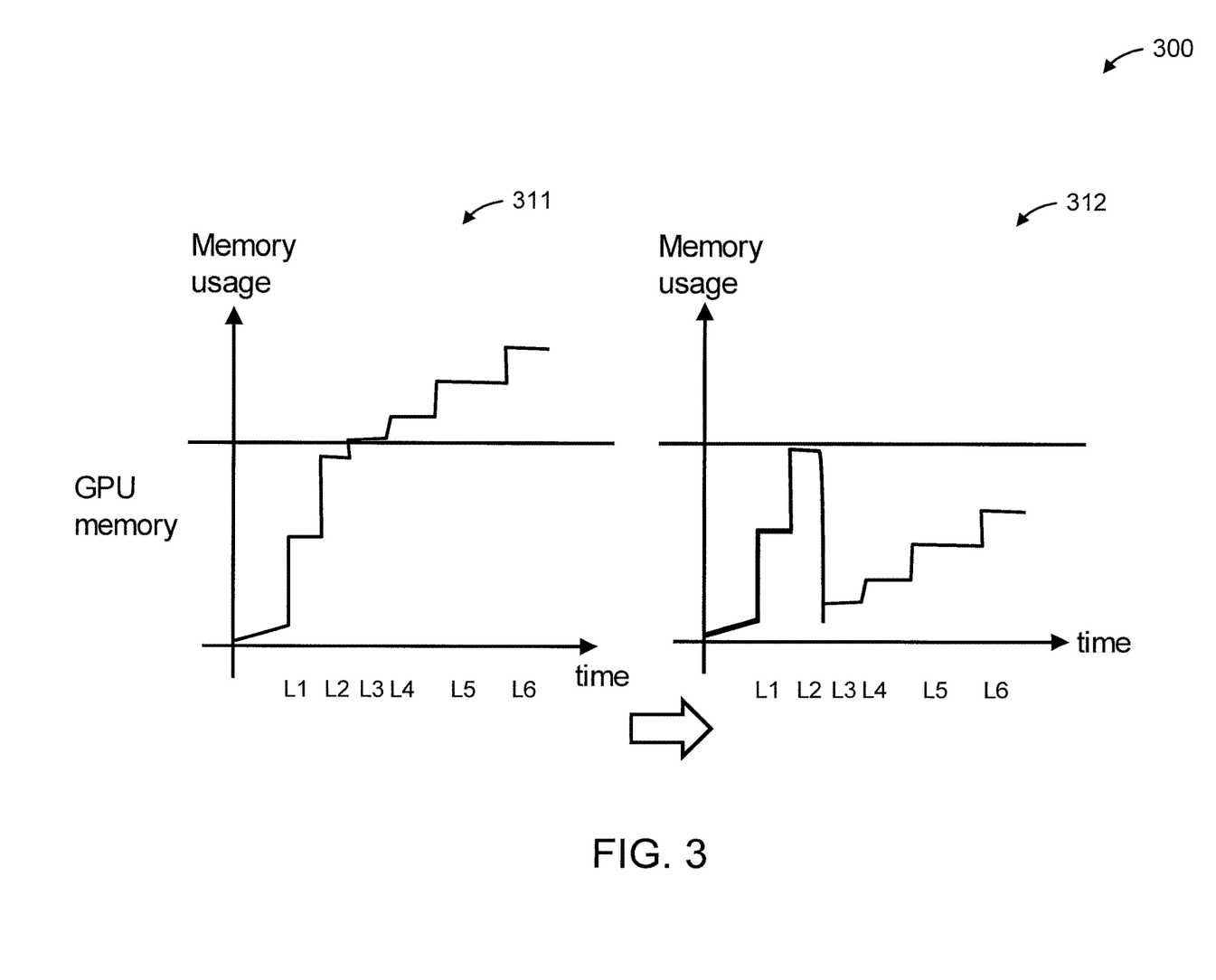
FIG. 3 are plots showing exemplary memory usage during a first iteration with normal mode and a second and subsequent iterations with OoC mode, in accordance with an embodiment of the present invention.

FIG. 3 are plots showing exemplary memory usage change 300 during a first iteration 311 and a second and subsequent iterations 312, in accordance with an embodiment of the present invention. In particular, the plots shown examples of memory usage change by selecting an appropriate execution mode(s). Each of the plots, a respective layer of a NN is shown relative to the x-axis, while memory usage of the GPU memory is shown relative to the y-axis.

Figure 4:
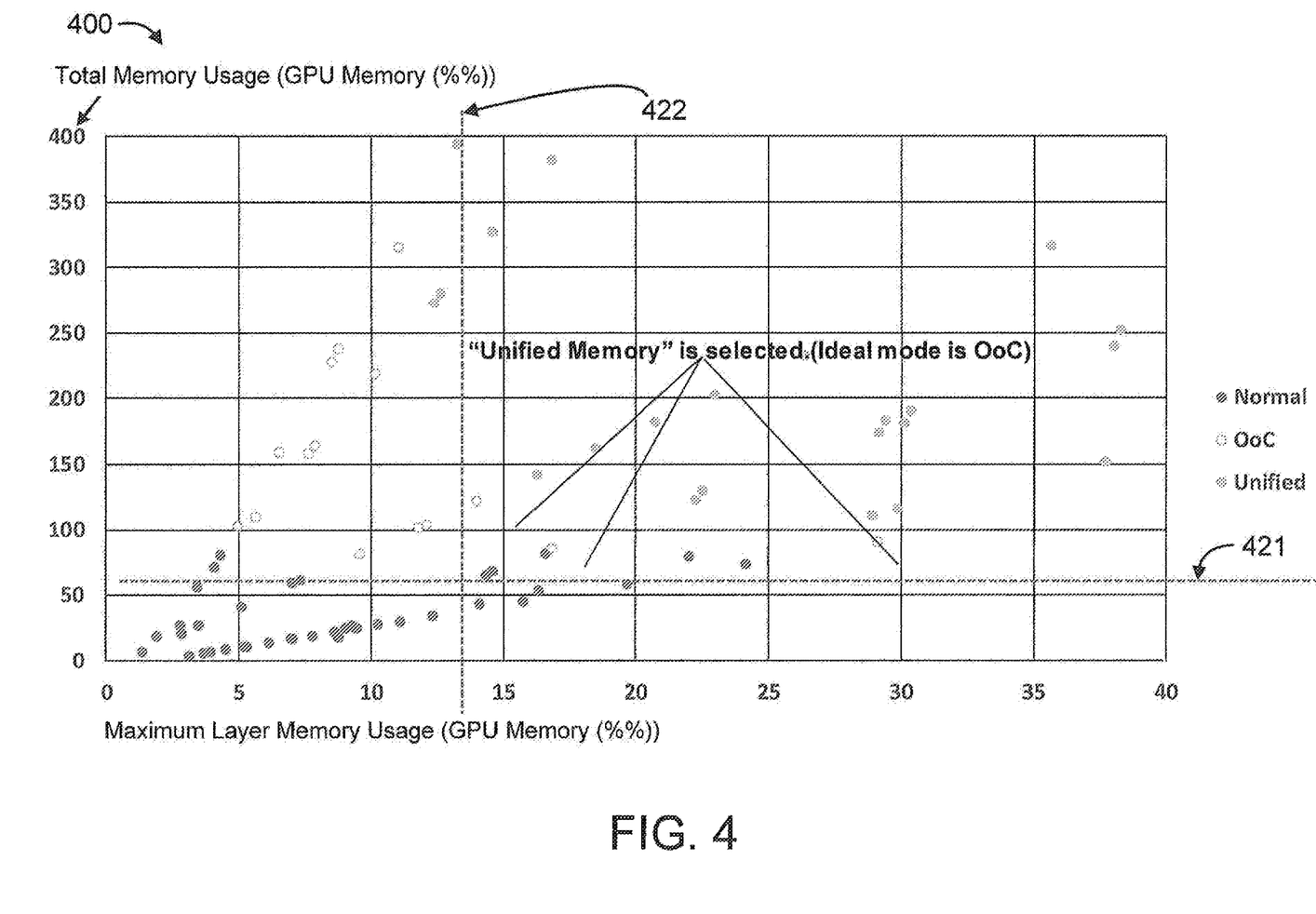
FIG. 4 is a plot showing exemplary memory usage, in accordance with an embodiment of the present invention.

FIG. 4 is a plot showing exemplary memory usage 400, in accordance with an embodiment of the present invention. Normal mode is shown using Black points, OoC mode is shown using hollow (White) points, and UM mode is shown using Gray points. Each point shows a specific execution case with a DNN model and parameters. The Black points shows normal mode is the best selection for the case, and the White and Gray points show OoC and UM mode are the best selection respectively. The memory usage 400 involves exemplary maximum layer memory usage (GPU memory %) shown relative to the x-axis versus total memory usage (GPU memory %) shown relative to the y-axis. The exemplary memory usage 400 is shown with respect to normal mode, OoC mode, and UM mode.

In the plot, horizontal line 421 corresponds to a RULE 1, and vertical line 422 corresponds to a RULE 2. RULE 1 is defined as follows: If the total memory usage<approximately 82%, then select normal mode, else go to RULE 2. Rule 2 is defined as follows: If the maximum layer memory usage<approximately 12%, then select OoC mode. It is to be appreciated that the term "approximately" refers to a margin of variation of 5% or less on the corresponding values. It is to be further appreciated that the preceding threshold values have been selected based on certain presumptions regarding the resources to be used to execute operations on a neural network. However, depending upon the implementation and available resources used, these values may be modified, as readily appreciated by one of ordinary skill in the art given the teachings of the present invention provided herein, while maintaining the spirit of the present invention.

As shown, despite UM mode being (initially) selected, the ideal mode is OoC mode.

A description will now be given of some of the many attendant advantages of the present invention, in accordance with one or more embodiments of the present invention.

As one advantage, the present invention is seamless to users. For example, no manual measurements and operations are required to choose execution mode.

As another advantage, no additional errors for pre-measurements are incurred, noting that of the modes mentioned herein, UM mode is the safest.

As yet another advantage, little performance penalty is introduced, since either the memory fits in the physical GPU or it does not, since UM mode overhead is low when the memory fits in the physical GPU.

The preceding advantages are merely illustrative, as one of ordinary skill in the art will contemplate these and various other advantages, given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
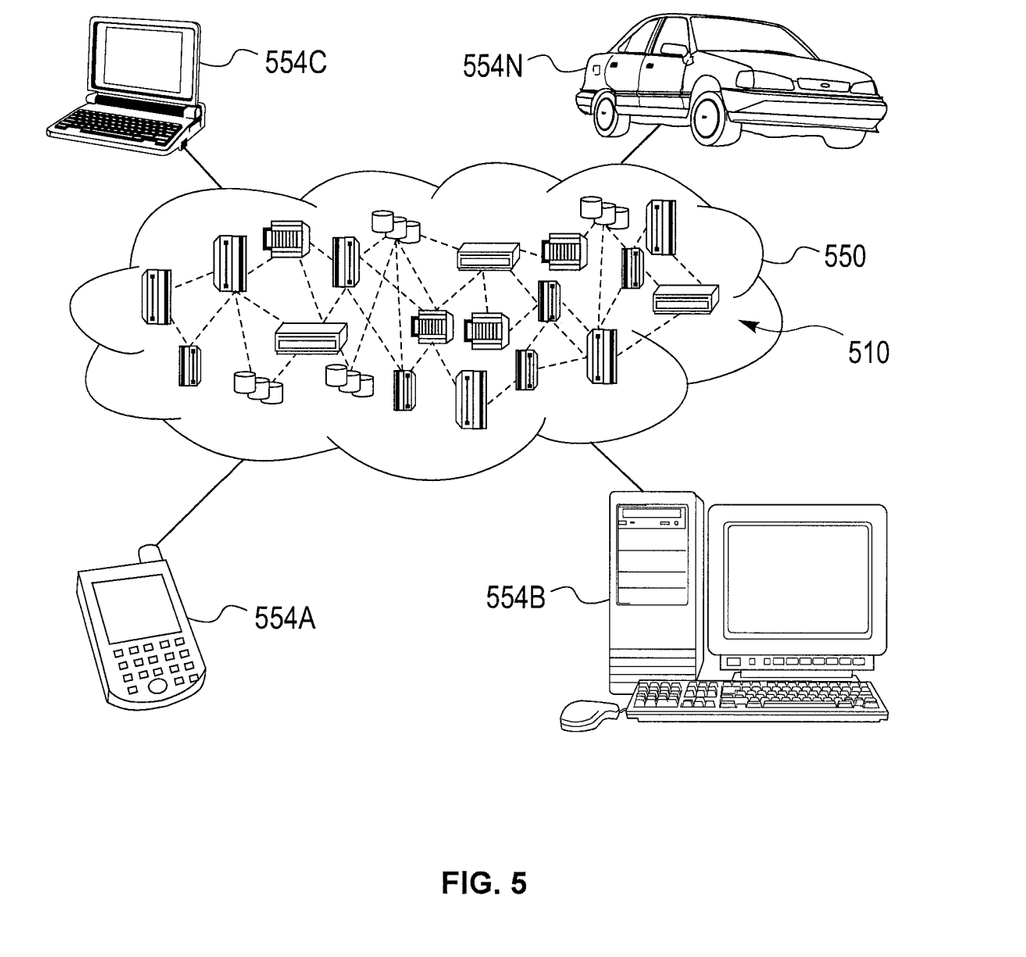
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
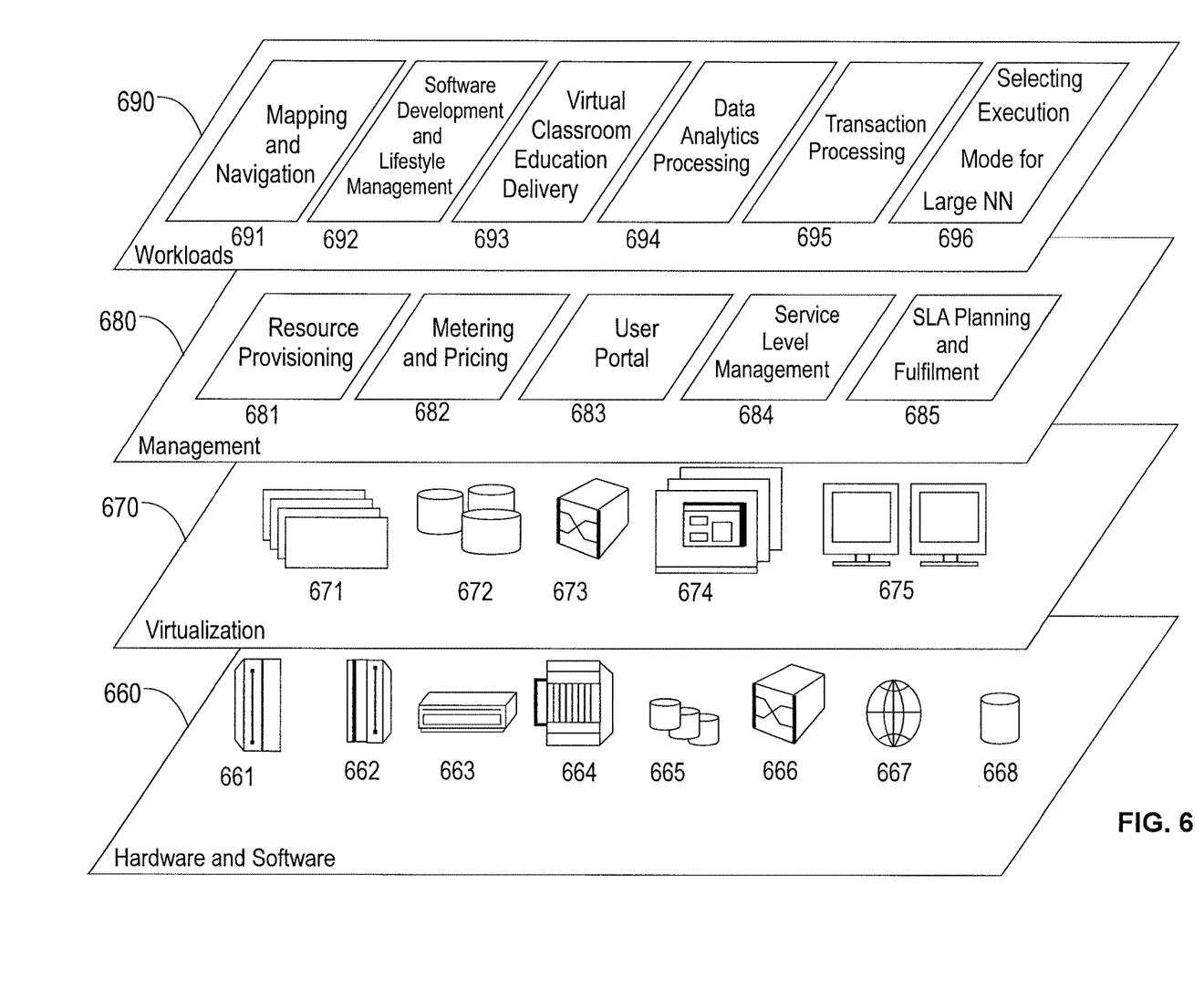
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and selecting execution mode for large Neural Network (NN) 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for selecting from among multiple Graphics Processing Unit (GPU) execution modes for a Neural Network (NN) having a size greater than a threshold physical GPU memory size, the multiple GPU execution modes comprising a normal memory mode, an Out-of-Core (OoC) execution mode, and a Unified Memory (UM) mode, the method comprising:

in a multiple execution mode selection scheme having any of the multiple GPU execution modes of the normal memory mode, the OoC execution mode, and the UM mode available for initial execution of all layers of the NN, performing an initial iteration by executing all of the layers of the NN with the UM mode from among the multiple GPU execution modes to ensure memory coverage of the NN;

for each iteration of executing all of the layers of the NN:
measuring memory usage for each layer of the NN;
changing to a UM mode by copying data from a non-unified memory to a UM responsive to an occurrence of a memory shortage when executing in the normal memory mode or OoC execution mode;
determining a total memory usage by all of the layers of the NN and a maximum layer memory usage; and
selecting from the multiple GPU execution modes a GPU execution mode for each of the layers of the NN to execute with in a next iteration, wherein the normal memory mode is selected responsive to the total memory usage by all of the layers of the NN being less than a first predetermined threshold and the OoC execution mode is selected responsive to the total memory usage by all of the layers of the NN being greater than or equal to the first predetermined threshold and the maximum layer memory usage being less than a second predetermined threshold.

2. The computer-implemented method of claim 1, wherein different ones of the multiple GPU execution modes can be selected for different ones of the layers.

3. The computer-implemented method of claim 1, wherein different ones of the multiple GPU execution modes can be selected for forward phases and backward phases.

4. A non-transitory computer program product for selecting from among multiple Graphics Processing Unit (GPU) execution modes for a Neural Network (NN) having a size greater than a threshold memory size, the multiple GPU execution modes comprising a normal memory mode, an Out-of-Core (OoC) execution mode, and a Unified Memory (UM) mode, the computer program product comprising a non-transitory computer readable storage medium having program instructions embodied therewith, the program instructions executable by a computer to cause the computer to perform a method comprising:

in a multiple execution mode selection scheme having any of the multiple GPU execution modes of the normal memory mode, the OoC execution mode, and the UM mode available for initial execution of all layers of the NN, performing an initial iteration by executing all of the layers of the NN with the UM mode from among the multiple GPU execution modes to ensure memory coverage of the NN;

for each iteration of executing all of the layers of the NN:
measuring memory usage for each layer of the NN;
changing to a UM mode by copying data from a non-unified memory to a UM responsive to an occurrence of a memory shortage when executing in the normal memory mode or OoC execution mode;
determining a total memory usage by all of the layers of the NN and a maximum layer memory usage; and
selecting from the multiple GPU execution modes a GPU execution mode for each of the layers of the NN to execute with in a next iteration, wherein the normal memory mode is selected responsive to the total memory usage by all of the layers of the NN being less than a first predetermined threshold and the OoC execution mode is selected responsive to the total memory usage by all of the layers of the NN being greater than or equal to the first predetermined threshold and the maximum layer memory usage being less than a second predetermined threshold.

5. The non-transitory computer program product of claim 4, wherein different ones of the multiple GPU execution modes can be selected for different ones of the layers.

6. The non-transitory computer program product of claim 4, wherein different ones of the multiple GPU execution modes can be selected for forward phases and backward phases.

7. A computer processing system for selecting from among multiple Graphics Processing Unit (GPU) execution modes for a Neural Network (NN) having a size greater than a threshold physical GPU memory size, the multiple GPU execution modes comprising a normal memory mode, an Out-of-Core (OoC) execution mode, and a Unified Memory (UM) mode, the system comprising:

at least one GPU;
a memory for storing program code;
a processing element for running the program code to
in a multiple execution mode selection scheme having any of the multiple GPU execution modes of the normal memory mode, the OoC execution mode, and the UM mode available for initial execution of all layers of the NN, perform an initial iteration by executing all of the layers of the NN with the UM mode from among the multiple GPU execution modes;

for each iteration of executing all of the layers of the NN:
measure memory usage for each layer of the NN;
change to a UM mode by copying data from a non-unified memory to a UM responsive to an occurrence of a memory shortage when executing in the normal memory mode or OoC execution mode;
determine a total memory usage by all of the layers of the NN and a maximum layer usage; and
select from the multiple GPU execution modes a GPU execution mode for each of the layers of the NN to execute with in a next iteration, wherein the normal memory mode is selected responsive to the total memory usage by all of the layers of the NN being less than a first predetermined threshold and the OoC execution mode is selected responsive to the total memory usage by all of the layers of the NN being greater than or equal to the first predetermined threshold and the maximum layer memory usage being less than a second predetermined threshold.

8. The computer processing system of claim 7, wherein different ones of the multiple GPU execution modes can be selected for different ones of the layers.

* * * * *